March 12, 1968  W. ENGEL ET AL  3,373,266
COUNTING DEVICE WITH MEANS FOR REMOTE INDICATION
Filed July 1, 1964
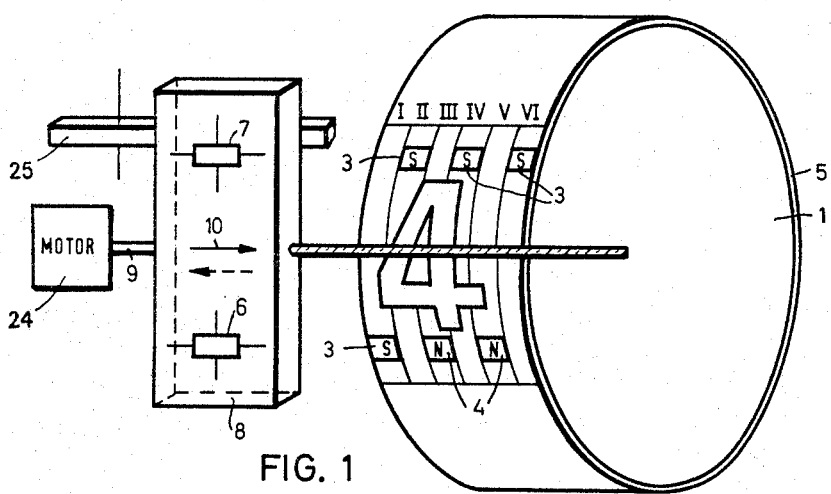
FIG. 1
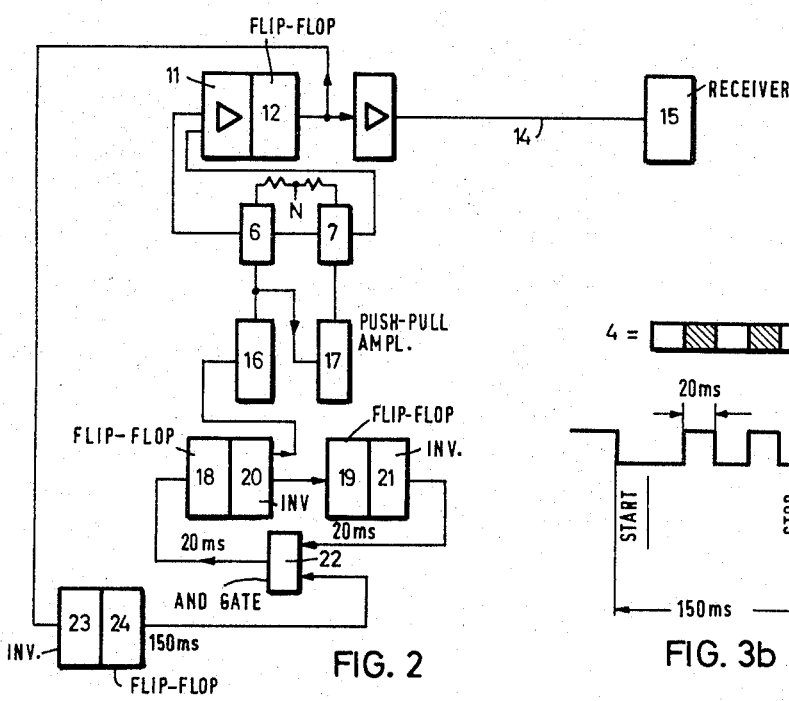
FIG. 2
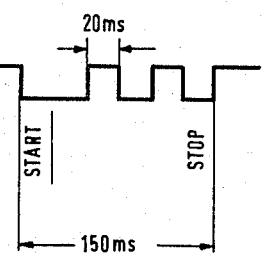
FIG. 3a
FIG. 3b

United States Patent Office 3,373,266
Patented Mar. 12, 1968

3,373,266
COUNTING DEVICE WITH MEANS FOR
REMOTE INDICATION
Walter Engel and Lothar Roth, Nurnberg, Germany, assignors to Siemens Aktiengesellschaft, Munich, Germany, a corporation of Germany
Filed July 1, 1964, Ser. No. 379,526
Claims priority, application Germany, July 3, 1963,
S 85,999
11 Claims. (Cl. 235—92)

ABSTRACT OF THE DISCLOSURE

A count indicator comprises a count indicating member having an outer surface and different indicating positions corresponding to different counts to be indicated on the outer surface in parallel tracks. Each of the indicating positions comprises magnetic indications. A Hall probe readout device is mounted in operative proximity with the outer surface of the count indicating member for responding to the magnetic indications of a selected one of the indicating positions. A guide supports the Hall probe readout device for selective transverse movement parallel to the axis of the count indicating member in operative proximity with the magnetic indications of the indicating positions to enable readout of a selected count at a time.

---

Our invention relates to counting devices equipped with one or more positionally adjustable indicator members, such as number-carrying wheels or drums, which are rotationally adjusted to thereby exhibit a counted value.

It is known to provide such devices, particularly electric power meters, with means for remote transmission of the metered amount. The continuous remote transmission, in most cases, is effected with the aid of electric pulses issuing from a pulse transmitter that rotates together with the counting mechanism, the pulses being supplied to a remote receiver either directly or through such intermediate circuit components as pulse transformers, for example. Such devices afford reading the indication of the counting mechanism not only directly at the mechanism itself but also at a remote location where the counted value can be applied for data processing purposes such as for the control of punching, printing and other data processing equipment. The transmitter and receiver devices, inclusive of all appertaining intermediate components, for example data storing devices designed as counting chain networks with relays, electronic counting decade arrangements and electromechanical individual counters or other intermediate stages, must secure an extremely precise and reliable performance and, as a rule, demand a considerable amount of equipment and circuitry. It is further necessary to maintain a permanent and continuously operating connection between the primary counting mechanism and the remote receiving station.

The principal object of the present invention is to provide a new and improved counting indicator and a counting indication transmission system.

It is an object of our invention to provide a counting indicator operating with a positionally adjustable member for exhibiting the count at the primary location, that affords a transmission of the counter reading to a remote station without the necessity of maintaining a permanently energized connection.

It is an object of the invention to provide a counting indicator which is efficient and effective in operation although of simple structure and economical in operation.

It is also an object of the invention to provide for reliable remote indication of a count exhibited by a counting mechanism of the drum or roller type in which each drum exhibits a series, preferably a decade of numbers uniformly distributed along the peripheral surface.

According to the invention, the positionally adjustable indicating member of a counter is provided with different magnetic code indications or marks which are disposed on the member and coordinated to its respective positions, for example to each of the respective number-carrying areas of the periphery, and the counter device is further equipped with magnetically responsive reader means which respond to the magnetic fields of the code indications correlated to the one count or number that is located in the indicating position at a time.

Particularly suitable as magnetically responsive reader means are galvano-magnetic sensors, preferably Hall probes.

The reading of the counter indication may be effected in various ways, and in accordance with another feature of the invention, the magnetically responsive sensing means are directly passed at constant speed along the magnetic indications of the indicator member, and after completion of the reading operation, the sensing assembly is returned to the starting position.

There are also various ways of providing the magnetic indications on the indicating member of the counter. For example, if the counter has a number-carrying drum or roller of non-magnetic material, the indications may be formed of small permanent magnets attached to the surface of the individual number rollers. Also applicable for attaching the magnetic indications is a magnetizable foil which is mounted on the indicating member of the counting device, for example on the peripheral surface of the respective number rollers, and is magnetized in accordance with the code combination identifying the particular number. The magnetization may be effected in different ways, such as, for example, with an orientation parallel to the depth, or in the longitudinal or transverse direction of the magnetizable and hard-magnetic or magnetically retentive material.

For the desired remote transmission and subsequent data processing, the magnetic indications preferably correspond to a code as employed for such purposes. Particularly advantageous is the code customary for teletypewriters or teletype printers because it affords employing for remote transmission and data processing the known and generally available teletypewriter and teleprinter devices. If, for example, a five-unit code is employed, requiring five tracks adjacent one another for each signal, then it may be difficult to accommodate the magnetic indications on the indicating rollers or discs of the counting mechanism, particularly if the counting mechanism is of small size. It is of advantage, therefore, to have the respective magnetizations of the individual tracks arranged on different lines, preferably in alternating spacial relation to each other. This has the advantage of preserving between the individual indications or magnetizations an interspace whose width corresponds to that of a track, thus securing a reliable signal representation and transmission without "cross talk" interference. According to such an arrangement of the magnetic indications in several lines, a readout or reading element in the form of a Hall probe is provided for each of the respective lines, and these probes are then alternately made effective in accordance with the line-wise arrangement of the indications or magnetizations.

It is further preferable, according to another feature of the invention, that the voltages issuing from the Hall or other sensing elements in accordance with the polarity of the indication or magnetization sensed or responded to, be converted into current pulses suitable for producing precise teletypewriter characters with a sufficient controlling power. For this purpose, a converting device is connected with the sensing members and is provided with timed flip-flop stages which convert the signal voltages from the Hall generators or other sensors into voltage pulses of suitable shape. These pulses, after being converted to corresponding current pulses, are supplied to printing mechanisms, punchers or other data processing receivers.

The above-mentioned and further objects, advantages and features of the invention, said features being set forth with particularity in the claims annexed hereto, will be apparent from, and will be set forth in, the following with reference to an emobdiment of a count indicator apparatus according to the invention illustrated by way of example in the accompanying drawing, in which:

FIG. 1 is a schematic perspective view of an embodiment of the indicating counter of the present invention with the appertaining reader equipment;

FIG. 2 is a circuit block diagram of an embodiment of a remote transmission system of the present invention for transmission of the indicated count; and FIGS. 3a and 3b are explanatory diagrams illustrating a code indication and a code pulse train relating to the performance of the counting device and transmission system of the present invention.

In FIG. 1, a number drum 1 is the rotationally or positionally adjustable indicating member of a counting device or arrangement. As a rule, a plurality of such number-carrying drums are coaxially mounted beside each other and are driven from a counting mechanism (not shown). These drums are decadically graduated, each carrying numerals from "0" to "9," the drum in each higher decimal position being switched one rotational step whenever the drum in the preceding position passes from 9 to zero. If desired, additional indicating drums may be provided for identification, calendar date, clock time and other data at the counting location. Such a number-drum mechanism is applicable, for example, as part of an electric power meter, a telephone conversation counter, a water level indicator, or various other purposes not essential to the invention. The individual number drums are provided with numerals, such as the numeral "4" shown at 2, which are readily visible so that the counted value can be visually interpreted or read off at the location of the counter.

The individual number areas of the drum 1 are provided with magnetic indications corresponding to the five-unit code. For example, the code areas or spots 3 constitute magnetized South poles S and the areas or spots 4 are magnetized to constitute North poles N. To permit the application of these polarized magnetizations, the drum 1 is provided with a magnetizable tape 5 around its periphery consisting of a magnetically retentive ferromagnetic material such as available in the trade under the name "Koercit." The magnetization may be applied so that the magnetic axis extends parallel to the depth of the tape, in the radial direction of the drum, this being the case in the embodiment of FIG. 1. However, the individual magnetized spot may also be polarized in the longitudinal direction extending parallel to the periphery or to the axis of the drum. In the latter case, each individual magnetization is effective with a South pole as well as with a North pole, but the readout head is then passed only over the desired polarity.

Since the magnetic indication is effected in accordance with a five-unit code, it is necessary to provide five tracks for each signal or numeral. The five signal tracks II, III, IV, V and VI are shown on the drum 1 in FIG. 1. An additional track I serves for starting the readout operation, as will be hereinafter further explained.

To prevent mutual interference such as cross talk, particularly between the opposingly polarized magnetizations, despite the fact that they are recorded in a minimum space, the group of magnetizations forming the code combination for each individual signal are divided into two lines, and two Hall probes 6 and 7 are provided for the respective lines. The Hall probes 6 and 7 are mounted on a carrier 8 which is guided for motion parallel to the axis of the drum past the drum periphery. In the illustrated embodiment, the carrier 8 is in threaded engagement with a spindle or rod 9 driven by an electric motor 24, and is restrained by a guide 25, which is parallel to the axis of the drum, to remain in the illustrated tangential position while being passed at constant speed alongside the drum in the direction of the arrow 10.

As the respective Hall probes 6 and 7 pass by the individual indications or magnetizations, each probe produces a correspondingly polarized Hall voltage. The Hall voltages are converted into a transmission signal suitable for the remote control of teleprinting or other data processing equipment. Suitable for this purpose is a conversion and transmission circuit as schematically shown, for example, in FIG. 2.

FIG. 3a represents schematically the signal that corresponds to the numeral "4" in the teleprinter code. The current pulses are identified by hatching. This signal, therefore, is composed of two current pulses which are issued between three pauses. The duration of each of the pulses and pauses is equal and is preferably of a magnitude of 20 milliseconds. FIG. 3b is a current versus time graph corresponding to the signal of FIG. 3a, and includes the start signal; the entire signal requiring a time period of 150 milliseconds.

As shown in FIG. 2, the two Hall probes 6 and 7 have their respective Hall voltages connected in series with each other in the input circuit of an impedance matching amplifier stage 11 which furnishes its output to a bistable flip-flop stage 12. The signal from the flip-flop stage 12 passes through a power amplifier 13 and a transmission line 14 of any suitable type to a remote receiver 15, such as a puncher or printer. The two Hall probes 6 and 7, which may comprise, for example, rectangular plates of gallium arsenide wafers, receive the necessary control current from two power supply stages 16 and 17 operating as amplifiers in push-pull operation.

The push-pull amplifier stages 16 and 17 are controlled by time-dependent flip-flop stages 18 and 19 with which they are connected through inverting or polarity reversing stages 20 and 21, respectively. Thus, the control current passes through the Hall probes 6 and 7 at a given rate determined by that of the push-pull amplifier stages 16 and 17. Connected to the two flip-flop stages 18 and 19 is an AND gate stage 22. The AND gate 22 receives one of its coincidence conditions from the inverter stage 21 and receives the second of its coincidence conditions from another flip-flop stage 24. The flip-flop 24 is controlled through an inverter stage 23 by the output voltage of the Hall generator amplifier 11, 12.

The flip-flops 18 and 19 set the width or duration of the current pulses of which an individual signal is composed. As hereinbefore mentioned, the flip-flop stages 18 and 19 are adjusted for a current-pulse width of 20 milliseconds (FIG. 3b). The flip-flop 24 determines the total length or duration of the signal and insures that the current normally flowing in the transmission line is switched on when the transmission of a signal is completed. Since the signal proper is preceded by a starting signal for initiating the transmission, the total timing of the flip-flop 24 is adjusted to the aforementioned total pulse width of 150 milliseconds.

It will be understood from the foregoing that each individual numeral is individually read off the indicator. This has the advantage that the distance between the individual numeral drums of the device need not be equal to one another and need not necessarily be invariable. It is only necessary that the individual drums remain in their occupied positions during individual readout operations.

In the conventional indicating devices, the first numeral drum, as a rule, is continuously rotatable, whereas all other drums jump stepwise from numeral to numeral. Since during the readout operation the magnetic indications must occupy a given position relative to the readout head, it is advisable to provide means which properly align the individual drums during the readout operation. If the first or lowest-digit drum is not read out with respect to remote transmission, it suffices to provide for alignment of the dums only when their respective indications are between nine and zero.

The operation of the remote transmission system of FIG. 2 is as follows. When voltage is applied, the transmission line 14 is traversed by current corresponding to the amplitude of the electrical signals. Consequently, the flip-flop stage 12 receives voltage so that due to the inverter stage 23, the flip-flop 24 does not produce a signal. Assume that the indicator is to be read and the result is to be transmitted to a remote station. A command is given from the remote station, for example a central station, to the locality with the effect of switching the drive motor 24 (FIG. 1) into operation. The motor 24 commences to move the Hall probes 6 and 7 and simultaneously aligns the drums, for example by actuating a brake which presses into a wedge-shaped groove on the periphery of each drum, thus placing the indicated numeral in accurate readout position.

When the Hall probe 6 moves over the South pole 3, the voltage produced by said probe controls the flip-flop 12 to furnish the output voltage of zero. Consequently, the flow of current through the line 14 is interrupted. As soon as the signal at the output of flip-flop 12 becomes zero, the flip-flop 24 is triggered through the inverter stage 23 and produces a signal which is supplied to the AND gate 22. Since the inverter 21 has already satisfied the second coincidence condition of the AND gate 22, the AND gate conducts a signal to the flip-flop 18 which is then triggered and functions through the inverter 20 to deenergize or make inoperative the amplifier 16 for the control current of the Hall probe 6 while switching the amplifier 17 into operation upon a lapse of 20 milliseconds, thus supplying control current to the Hall probe 7. The Hall probe 7 is then energized or in operative condition.

As the Hall probe 7 continues travelling, it encounters the same polarity of magnetization, which is the South pole, as the Hall probe 6 did. Consequently, there is no change in the common output circuit of the Hall probes. Upon a lapse of 20 milliseconds, the flip-flop stages 18 and 19 again activate or energize the Hall probe 6. Since the Hall probe 6 is then opposite a North pole N, a voltage is generated in said Hall probe and applies a positive control voltage to the flip-flop 12, thus producing a current pulse which passes through the transmission line 14. This pulse, too, has a duration of 20 milliseconds, corresponding to the time-setting of the two flip-flop stages 18 and 19.

Thereafter, the Hall probe 7 is energized or activated and again interrupts the current flow. Subsequently, the Hall probe 6 is again energized and causes current to flow in the transmission line 14. Thereafter the Hall probe 7 discontinues the current flow. When a total of 150 milliseconds have elapsed, the coincidence condition of the AND gate 22 is eliminated, thus reestablishing the initial situation in which current flows continuously in the transmission line 14. FIG. 3b represents these current flow conditions. Analogous operations are repeated during the readout of each character on an indicator drum, and each of the other indicator drums in a multiple-drum device.

The readout of the counting mechanism occurs completely without reactive effect. This has the advantage that the extremely slight friction of the drum mechanism is not increased, so that it may be driven from a low-power measuring member, such as, for example, the rotor of an electric meter. If desired, however, a secondary counting mechanism, such as a servo-controlled counter, operating in dependence upon a primary counter but having a considerably more rugged design, may be read out in the same manner according to the invention.

While the invention has been described with reference to a counting mechanism having individual numeral drums mounted coaxially beside each other, the drums may also be arranged in a plane, for example in a circular arc. In this case the transducer head of the readout device performs a rotary motion rather than a rectilinear motion. It will be understood, therefore, that the invention is not limited to a particular design of the indicating member.

As mentioned, the counting device according to the invention is applicable for measuring electrical power, quantities of solid liquid or gaseous substances, a number of telephone connections, and is applicable for any other purposes for which counting or digital mechanisms of similar type are applicable.

We claim:
1. A count indicator, comprising
 a count indicating member having an axis, an outer surface and different indicating positions corresponding to different counts to be indicated on said outer surface in parallel tracks, each of said indicating positions comprising magnetic indications;
 Hall probe readout means mounted in operative proximity with the outer surface of said count indicating member for responding to the magnetic indications of a selected one of said indicating positions; and
 guide means in operative proximity with the outer surface of said count indicating member parallel to and spaced from the axis thereof, said guide means supporting said Hall probe readout means for selective transverse movement parallel to said axis in operative proximity with the magnetic indications of said indicating positions to enable read out of a selected count at a time.

2. A count indicator as claimed in claim 1, wherein said guide means moves said readout means at substantially constant speed.

3. A count indicator as claimed in claim 1, wherein said count indicating member has a magnetizable material on the outer surface thereof, said magnetizable material having different indicating positions thereon corresponding to different counts to be indicated, each of said indicating positions having magnetic indications on said magnetizable material.

4. A count indicator as claimed in claim 1, further comprising
 a visual indication of the corresponding count on the outer surface of said count indicating member at each of said indicating positions, said readout means responding to said magnetic code indications in a predetermined sequence.

5. A count indicator as claimed in claim 1, wherein the magnetic code in dications of a count are in a plurality of alternate ones of a plurality of adjacent parallel tracks.

6. A count indicator as claimed in claim 1, wherein the magnetic code indications of a count are in spaced lines in a plurality of alternate ones of a plurality of adjacent parallel tracks, and said Hall probe readout means comprises a Hall probe for each of the lines of the magnetic code indications of a count and means for alternately energizing said Hall probes in accordance with the positions of said magnetic code indications.

7. A count indicator as claimed in claim 6, wherein each group of magnetic code indications of a count is preceded by a starting magnetic indication of a predetermined polarity.

8. A count indicator as claimed in claim 8, wherein said count indicating member has a surface of hard-magnetic material.

9. A count indicator as claimed in claim 1, further comprising
 signal control means comprising circuit means connected to the output of said Hall probe readout means for converting the electrical signals produced by said Hall probe readout means into current pulses.

10. A count indicator as claimed in claim 9, wherein said signal control means comprises a timed flip-flop arrangement for shaping the electrical signals produced by said Hall probe readout means.

11. A count indicator as claimed in claim 9, wherein said signal control means comprises a timed flip-flop arrangement for producing a pulse having a duration corresponding to the duration of an electrical signal produced by said Hall probe readout means.

References Cited

UNITED STATES PATENTS

| | | | |
|---|---|---|---|
| 2,855,585 | 10/1958 | Quinby | 340—347 X |
| 3,170,323 | 2/1965 | Kahrt | 324—45 X |
| 3,185,920 | 5/1965 | Brunner | 324—45 X |

MAYNARD R. WILBUR, *Primary Examiner.*

DARYL W. COOK, *Examiner.*

G. J. MAIER, *Assistant Examiner.*